(12) United States Patent
Ji et al.

(10) Patent No.: US 9,642,064 B2
(45) Date of Patent: *May 2, 2017

(54) DATA ROUTING IN HYBRID WIRELESS COMMUNICATION NETWORKS

(71) Applicants: AT&T Intellectual Property I, L.P., Atlanta, GA (US); NEC Laboratories America, Inc., Princeton, NJ (US)

(72) Inventors: Lusheng Ji, Randolph, NJ (US); Chonggang Wang, Princeton, NJ (US); Ting Wang, West Windsor, NJ (US)

(73) Assignees: AT&T Intellectual Property I, L.P., Atlanta, GA (US); NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,702

(22) Filed: Apr. 19, 2016

(65) Prior Publication Data

US 2016/0234753 A1 Aug. 11, 2016

Related U.S. Application Data

(63) Continuation of application No. 14/589,643, filed on Jan. 5, 2015, now Pat. No. 9,344,950, which is a (Continued)

(51) Int. Cl.
*H04W 40/12* (2009.01)
*H04L 12/801* (2013.01)
(Continued)

(52) U.S. Cl.
CPC ............ *H04W 40/12* (2013.01); *H04L 47/35* (2013.01); *H04L 12/56* (2013.01); *H04L 47/32* (2013.01); *H04W 84/18* (2013.01)

(58) Field of Classification Search
CPC . H04L 12/56; H04L 12/5602; H04L 2012/56; H04L 2012/5635; H04L 29/0653;
(Continued)

(56) References Cited

U.S. PATENT DOCUMENTS 6,700,871 B1 3/2004 Harper et al.
6,763,195 B1 7/2004 Willebrand et al.
(Continued)

OTHER PUBLICATIONS

Sivathasan, et al., "RF/FSO Wireless Sensor Networks: A Performance Study", IEEE Global Telecommunications Conference (GLOBECOM), 2008, IEEE, 5 pages.
(Continued)

*Primary Examiner* — Khoa Huynh
(74) *Attorney, Agent, or Firm* — Amin, Turocy & Watson, LLP

(57) ABSTRACT

Data is routed in a mesh network of devices that can communicate wirelessly through a plurality of technologies. One or more of such devices receive broadcast message(s) from a destination device intended to receive the data, and generate a first radio link quality metric (RLQM) value based on the broadcast message(s). A source device originates and delivers a quantum of data with an embedded first RLQM value. A set of intermediate devices relays the quantum of data if a forwarding criterion is fulfilled; the forwarding criterion is based in part on the first RLQM value and a second RLQM value generated by an intermediate device in the set of intermediate devices based on the broadcast message(s). The intermediate device exploits an optical interface to transmit the quantum of data. The destination device broadcasts an acknowledgement signal in response to receiving intended data.

20 Claims, 8 Drawing Sheets

Related U.S. Application Data continuation of application No. 12/637,392, filed on Dec. 14, 2009, now Pat. No. 8,958,291.

(60) Provisional application No. 61/250,321, filed on Oct. 9, 2009.

(51) Int. Cl.
    *H04L 12/823* (2013.01)
    *H04L 12/54* (2013.01)
    *H04W 84/18* (2009.01)

(58) Field of Classification Search
    CPC ... H04L 29/06095; H04L 45/74; H04L 47/10; H04L 47/27; H04L 47/30; H04L 47/32; H04L 47/35; H04L 49/3009; H04L 49/309; H04W 40/12; H04W 40/125; H04W 40/14; H04W 40/16; H04W 84/18
    See application file for complete search history.

(56) References Cited

U.S. PATENT DOCUMENTS

| | | | | |
|---|---|---|---|---|
| 7,423,995 | B1* | 9/2008 | Elliott | H04L 41/5009 370/329 |
| 7,603,137 | B1 | 10/2009 | Elliott | |
| 2003/0231611 | A1* | 12/2003 | Nakao | H04W 12/02 370/338 |
| 2004/0043782 | A1* | 3/2004 | Gupta | H04W 88/02 455/517 |
| 2008/0019289 | A1 | 1/2008 | Monden et al. | |
| 2009/0028169 | A1 | 1/2009 | Bear et al. | |
| 2010/0014868 | A1 | 1/2010 | McGlynn et al. | |

OTHER PUBLICATIONS

Verma, et al., "Free-Space Optics Based Wireless Sensor Network Design", 2008, 12 pages.

Yuksel, et al., "Optimal Communication Coverage for Free-Space-Optical MANET Building Blocks", 2005, 5 pages.

Akella, et al., "Building Blocks for Mobile Free-Space-Optical Networks", Second IFIP International Conference on Wireless and Optical Communications Networks (WOCN), 2005, IEEE, 5 pages.

Duffield, et al., "A Flexible Model for Resource Management in Virtual Private Networks", SIGCOMM '99, 1999, pp. 95-108, ACM, 14 pages.

Office Action dated Feb. 28, 2012 for U.S. Appl. No. 12/637,392, 17 pages.

Office Action dated Aug. 14, 2012 for U.S. Appl. No. 12/637,392, 21 pages.

Office Action dated Dec. 3, 2013 for U.S. Appl. No. 12/637,392, 15 pages.

Office Action dated Jun. 18, 2014 for U.S. Appl. No. 12/637,392, 19 pages.

Notice of Allowance dated Oct. 6, 2014 for U.S. Appl. No. 12/637,392, 5 pages.

Office Action dated Sep. 11, 2015 for U.S. Appl. No. 14/589,643, 37 pages.

* cited by examiner

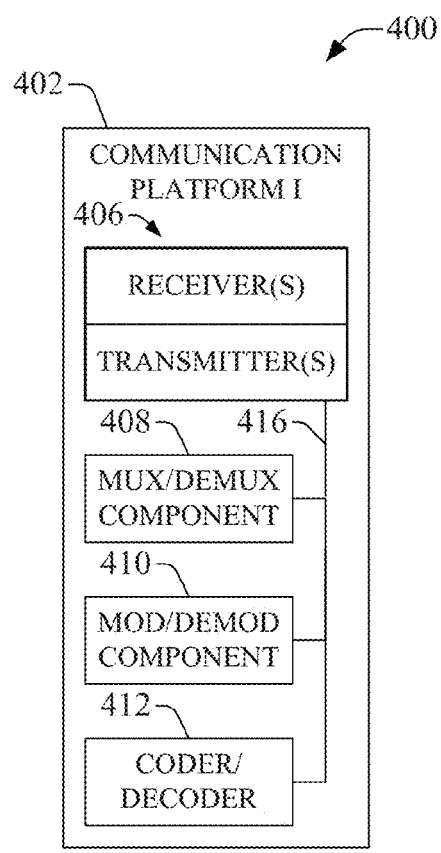 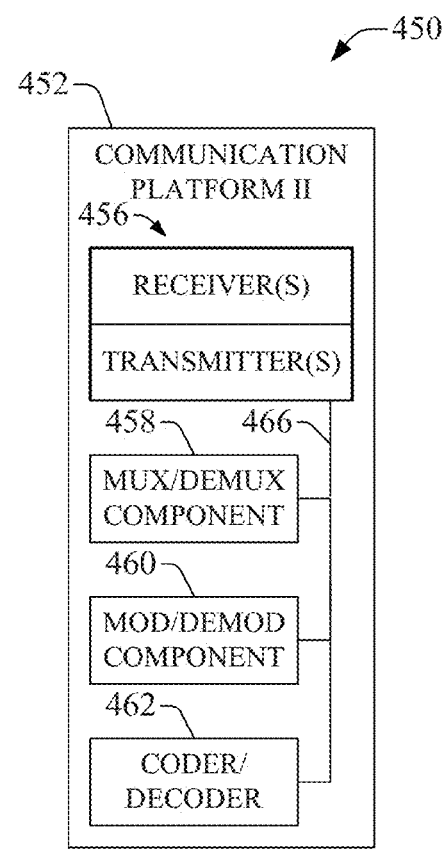
FIG. 4A
FIG. 4B

DATA ROUTING IN HYBRID WIRELESS COMMUNICATION NETWORKS

CROSS-REFERENCE TO RELATED APPLICATIONS

This application is a continuation of, and claims priority to each of, U.S. patent application Ser. No. 14/589,643, and entitled "DATA ROUTING IN HYBRID WIRELESS COMMUNICATION NETWORKS," filed Jan. 5, 2015, which is a continuation of U.S. Pat. No. 8,958,291, entitled "DATA ROUTING IN HYBRID WIRELESS COMMUNICATION NETWORKS," filed Dec. 14, 2009, which claims priority to U.S. Provisional Application Ser. No. 61/250,321, filed on Oct. 9, 2009, and entitled "DATA FORWARDING IN OPTICAL-RADIO HYBRID WIRELESS COMMUNICATION NETWORKS," the entireties of which applications are hereby incorporated herein by reference.

TECHNICAL FIELD

The subject disclosure relates generally to wireless communications and, more particularly, to routing data in a network of devices that can communicate wirelessly through a plurality of interfaces.

BACKGROUND

Mesh networks of devices that can communicate wirelessly via a radio interface and an optical interface generally route data via the radio interface because it may be easier to form radio links between the radio interfaces of nearby devices. In addition, radio communication does not have the line-of-sight clearance requirement between a pair of transmitter and receiver. Compared to wide-beam optical communication (WOC) technologies, such as the Visible Light Communication (VLC), radio communication oftentimes has the advantage of longer range. In the alternative, such mesh networks route data based on solution(s) of a mesh network forwarding problem in which addresses the issue of how to forward data from a first node to a second node in the mesh network over a multi-optical-hop network. Compared to data routing via radio interface(s), forwarding data over multiple optical links formed amongst pair of nodes in the mesh network typically can provide higher data throughput, better security, and more efficient energy consumption. Yet, implementation of data routing based on solution(s) of forwarding problem(s) in the mesh network commonly entails, for example, exchange of network topology information, such as neighbor configuration, so that each device, or node, in the mesh network can determine how a data packet has to be forwarded to reach its destination node. In addition, solution(s) of forwarding problem(s) also include storage and maintenance (e.g., update) of various realizations of routes for data packet delivery. Therefore, in view of at least such exchange and storage of information, it is readily apparent that routing data in a mesh network based on solution(s) of a forwarding problem is generally resource intensive and thus can hinder network performance, especially although not exclusively in high-density mesh networks.

BRIEF DESCRIPTION OF DRAWINGS

FIG. 4A-4B illustrate, respectively, block diagrams of a communication platform that is part of a radio telecommunication interface and an optical telecommunication interface in accordance with aspects described herein.

DETAILED DESCRIPTION

Figure 1:
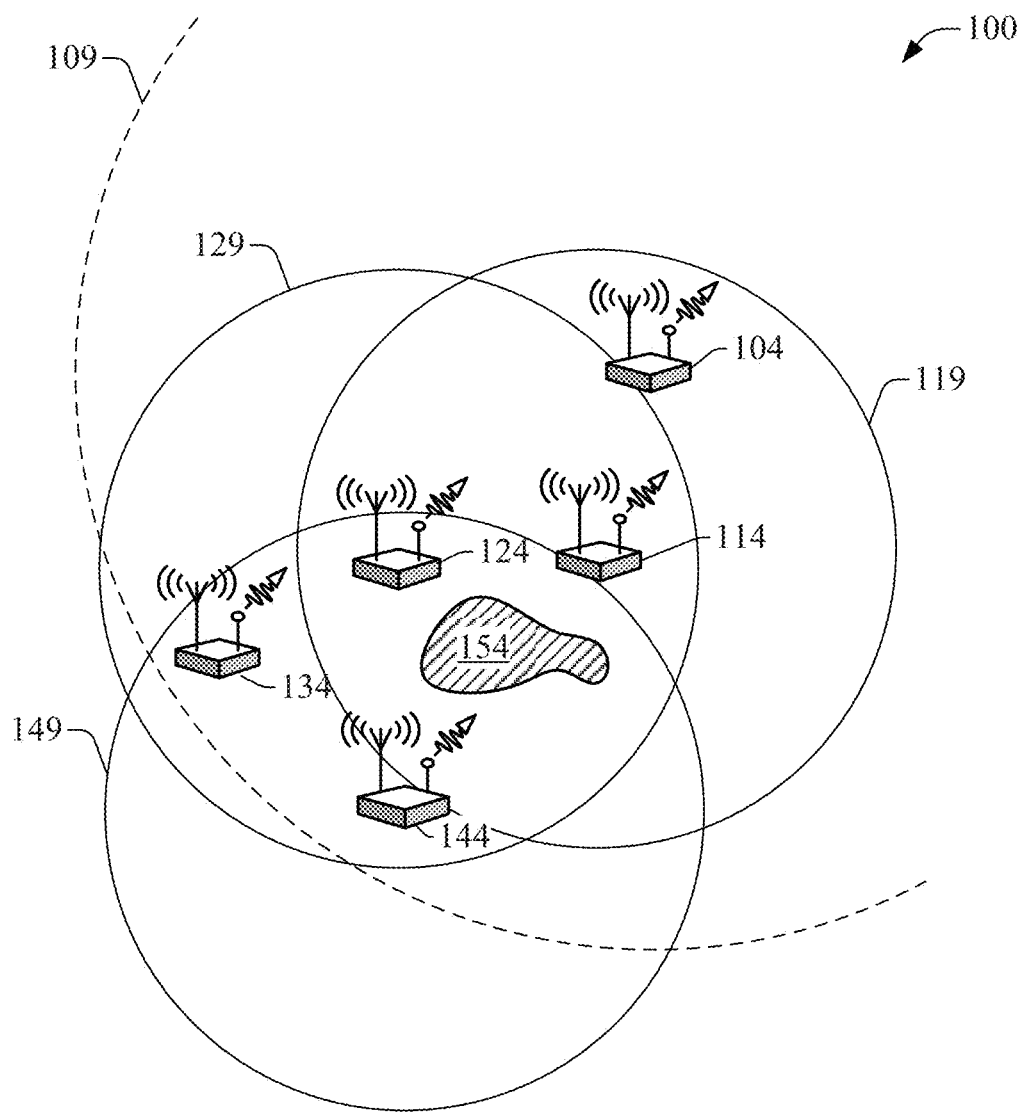
FIG. 1 illustrates an example wireless environment that includes devices that can communicate wirelessly through radio and optical communication interfaces in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the subject disclosure may be practiced without these specific details. In other instances, well-known structures and devices are shown in block diagram form in order to facilitate describing the various embodiments of the subject disclosure.

As used in this application, the terms "component," "system," "platform," "layer," "node," "interface," and the like are intended to refer to a computer-related entity or an entity related to an operational apparatus with one or more specific functionalities, wherein the computer-related entity and the entity related to the operational apparatus can be either hardware, a combination of hardware and software, software, or software in execution. One or more of such computer-related entities or entities related to the operational apparatus are also referred to herein as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, layer, node, interface, and the like.

Various aspects of the subject disclosure are presented in terms of systems or embodiments that may include a number of components, modules, nodes, interfaces, platforms, or the like. It is to be understood and appreciated that the various systems or embodiments may include additional components, modules, etc., and/or may not include all of the components, modules, nodes, interfaces, platforms, etc. discussed in connection with the annexed drawings. A combination of these approaches may also be used.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further yet, the term "set" as employed herein excludes the empty set. Thus, a "set" in the subject disclosure includes one or more elements or entities. As an illustration, a set of devices includes one or more devices, a set of recipients includes one or more recipients, a set of addresses can include K addresses with K a natural number greater than or equal to unity.

One or more embodiments system(s), device(s), and method(s) to route data in a mesh network of devices that can communicate wirelessly through radio and free-space optical interfaces. For a destination device intended to receive the data, at least one device in the mesh network can receive broadcast message(s) from the destination device and generate a radio link quality metric (RLQM) value based on the broadcast message(s). A source device that resides within radio communication range of the destination device and originates a quantum of data (e.g., a data packet, a frame, a symbol) can deliver the quantum of data with an embedded first RLQM value; the quantum of data intended to the destination device. An intermediate device that receives the quantum of data with the embedded first RLQM value can relay the quantum of data if the first RLQM value and a second RLQM value generated by the intermediate device fulfill a predetermined forwarding criterion, which can be based in part on at least one of the first or second RLQM values. The intermediate device can forward the quantum of data through its free-space optical interface; the forwarded quantum of data is formatted to include the second RLQM value. After the quantum of data is received, the destination device broadcasts an acknowledgement (ACK) signal via at least one of a radio telecommunication interface or an optical interface functionally available to the destination device. The ACK signal is utilized by one or more intermediate devices as an indication to discard queued instance(s) of the quantum of data, and as an end-to-end acknowledgement of successful transmission for the source device.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure may be employed. Other aspects, advantages and novel features of the disclosure will become apparent from the following detailed description of the disclosure when considered in conjunction with the drawings.

As described in greater detail below, the subject disclosure relates to routing, or forwarding, data in a mesh network of devices which can communicate wirelessly through a plurality of telecommunication interfaces, e.g., a radio telecommunication interface and a telecommunication optical interface, wherein a source node and a collector node in the mesh network are within the mutual telecommunication range of a first interface (e.g., radio communication range) available to such nodes, but outside of the mutual telecommunication range of a second interface (e.g., Wide-beam Optical Communication (WOC) interface) available to such nodes. In an aspect, the various telecommunication interfaces can have complementary features and operate in accordance with disparate technologies and communication protocols. For example, compared to radio, optical telecommunication can support higher data rate(s) yet shorter telecommunication range. Moreover, optical telecommunication typically is more secure and energy efficient. Conventionally, in mesh network in which one or more of the devices comprise radio and optical interfaces for telecommunication, the source and collector node communicate over the radio interface. In contrast, in the subject disclosure, if the mesh network density is effectively or sufficiently high that there are intermediate nodes located between the source node and the destination node, such intermediate nodes can serve as relay nodes for telecommunication through the second interface (e.g., WOC interface) from the source node to the destination node. Thus, efficiencies or advantages of telecommunication through the second interface (e.g., WOC interface) can be realized. For example, advantages of optical telecommunication (e.g., WOC) such as high throughput, low energy consumption, and high security, can be achieved. Various aspects or features described herein convey various mechanisms or approaches to organization or coordination of data (e.g., data packet) relaying.

Features or aspects of data delivery within a wireless environment that comprises a set of hybrid devices are illustrated herein with data packet(s). However, such features or aspects set forth in the subject disclosure can be exploited for substantially any or any type of data quantum (e.g., a frame, a symbol, a chip) as established in accordance with a network communication protocol employed by hybrid device(s) in the set of hybrid devices.

Referring to the drawings, FIG. 1 illustrates an example wireless environment 100 that includes devices that can communicate wirelessly through radio and free-space optical communication interfaces in accordance with aspects described herein. Different from traditional narrow beam (such as laser based) optical communication devices, the transmitters of this type of optical communication devices emit wide-beam light with low-cost light sources such as light emitting diodes (LEDs). When a device's optical receptor can receive transmissions made by another device's optical transmitter, an optical link is formed from the transmitter to the receiver. This type of free-space optical communication primarily is designed for short range (e.g. in-room) telecommunications. We refer to this type of new communication as Wide-beam Optical Communication (WOC). Because WOC devices do not require complex mechanical and lens systems for targeting and focusing communication beam, they are low cost and easy to deploy.

The devices can accomplish optical wireless communication at least in part through WOC and are deployed in a mesh network. Such devices are referred to herein as radio-WOC hybrid devices or hybrid devices. A mesh network formed with hybrid devices includes wireless links (not shown in FIG. 1) of radio and optical communication technologies and thus can exploit advantages of both radio and WOC communications. A hybrid device can establish a wireless radio link through a radio interface and a wireless optical link through an optical interface. Hybrid devices in such mesh network are also referred to herein as nodes. In hybrid devices FIG. 1 (e.g., 104, 114, 124, 134, 144), radio telecommunication interface is represented with a trident segment, whereas optical telecommunication interface is represented with a segment with an associated outgoing arrow.

In an aspect of wireless communication described herein, data (e.g., a data packet) can be delivered, or routed, from a source node to a collector node through multi-hop WOC. The source node is a hybrid device, e.g., 144, with optical telecommunication range 149 and that operates within the radio transmission range of the collector node, which also is a hybrid device, e.g., 104 (with radio transmission range 109 indicated with a dashed line arc), within a mesh network of hybrid devices. The source node and the collector node are outside their range of optical wireless communication. Thus, a set of intermediate nodes (e.g., 114, 124) forwards or relays data from the source node to the collector node via optical wireless communication. Each node in the set of intermediate nodes is a hybrid device, and two or more nodes such set can operate within their range of optical wireless communication. For instance, optical communication range 129 of hybrid device 124 can overlap with optical communication range 119 of hybrid device 114, and such hybrid devices can be included in a set of intermediate nodes that enable communication of data amongst hybrid device 144 and hybrid device 104, which in an example wireless communication scenario can embody, respectively, a source node and a collector node.

In the subject disclosure, delivery or routing of data can exploit attenuation or path loss of electromagnetic (EM) radiation waves as they propagate through a medium. As hybrid devices within a mesh network can operate within their range of radio wireless communication, data can be routed towards a destination node, e.g., a collector node, in direction(s) that can increase radio signal quality or strength. A first hybrid device in a mesh network can utilize a radio link quality metric (RLQM) to assess radio signal strength (RSS) or radio propagation attenuation for a radio signal received from a second hybrid device, and such RLQM can be exploited, at least in part, to deliver or route data. As an example, at least one node in a set of intermediate nodes (e.g., hybrid devices 114, 124, and 134) can determine an RLQM for radio for radio signal received from a collector node (e.g., hybrid device 104) and retain such RLQM in a memory operationally coupled, e.g., functionally integrated or attached, to the at least one node. An RLQM can include one or more metrics for radio signal strength such as radio signal strength (RSS) indicator(s). Data transmitted from a source node to a set of intermediate nodes and relayed amongst intermediate nodes in such set also convey an RLQM value as determined by a node originates data transmission; such RLQM value is updated prior to delivery by the node that originates data transmission. In addition, RLQM value also can be exploited to dictate delivery priority of a data packet available for transmission from two or more intermediate nodes (e.g., hybrid device 134 and hybrid device 124).

In an illustrative telecommunication scenario, if hybrid device 104 operates as collector node, RSS indicators of radio signal delivered by hybrid device 104, as observed at hybrid devices 114, 124, 134, and 144, can adopt values denoted by $RSS_{114}$, $RSS_{124}$, $RSS_{134}$, and $RSS_{144}$. As power of emitted EM radiation decays as distance increases from the EM radiation emitter, hybrid devices that are more distant from hybrid device 104 observe a smaller RSS indicator: For illustrated hybrid devices in example environment 100, RSS indicators satisfy $RSS_{144} \approx RSS_{134} < RSS_{124} < RSS_{114}$. In addition, in the subject illustrative scenario, hybrid device 144 can have a data packet to deliver to the collector node, e.g., hybrid device 104, and thus hybrid device 144 embodies a source node. The data packet is transmitted over WOC interface of the source node with the $RSS_{144}$ (the source observed RLQM value for radiofrequency EM radiation received from the collector node) embedded in the data packet. Although hybrid devices 114, 124, and 134 are within range of optical communication (e.g., WOC) of the source node, e.g., hybrid device 144, there is no line-of-sight (LOS), line-of-communication (LOC) between the source node and hybrid device 114 because of the location of obstacle 154. Accordingly, hybrid devices 124 and 134 can receive transmission(s) from the source node, e.g., hybrid device 144. In an aspect, hybrid device 134 does not transmit, or forward, the data packet received from the source node because of at least one of the following reasons: (i) $RSS_{134}$ is not sufficiently large compared to the RSS embedded in the data packet, e.g., $RSS_{144}$ in the subject illustrative scenario. (ii) Hybrid device 124 initiates transmission the data packet prior to delivery of the data packet by hybrid device 134. Priority delivery can be based on magnitude of the observed RLQM value at hybrid node 124 and the RLQM value observed at hybrid node 134 relative to the RLQM value embedded in the data packet: for instance, if $RSS_{124} - RSS_{144} > RSS_{134} - RSS_{144}$, hybrid device 124 can have priority for delivery of the data packet received from the source node. Hybrid device 124 retransmits the data packet received from the source node with the embedded RSS updated from $RSS_{144}$ to $RSS_{124}$. Likewise, transmission of the data packet by hybrid device 124 can be received by hybrid devices 114, 134, and 144, but hybrid devices 134 and 144 cannot retransmit the data packet in view of at least that $RSS_{134}$ and $RSS_{144}$ are lower than the RSS embedded in the received data packet, e.g., $RSS_{124}$. In the subject illustrative telecommunication scenario, transmission of the data packet by hybrid device 114 is received by hybrid device 104, the intended collector node, or destination node, which can acknowledge receipt of the data packet (e.g., convey an ACK signal over its radio interface, for example) so that no further transmission of the data packet occurs.

With respect to conventional approaches to routing of data in a mesh network, at least one advantage of the features or aspects described herein is that data can be transmitted from a source node to a collector node without generation and retention of forwarding paths or routes, or exchange of topology information (e.g., neighborhood configuration(s)) of the underlying mesh network. Such conventional approaches typically require nodes (e.g., hybrid devices) in the mesh network to discover its neighboring nodes and exchange topology information, or knowledge, to determine, e.g., compute, forwarding paths towards different destinations, e.g., collector nodes. Such discovery and information exchange generally demands utilization of non-negligible communication resources, especially but not exclusively wireless communication medium access time. In contrast, in a mesh network of hybrid devices, data transmission enabled by system(s), device(s), and method(s) of the subject disclosure does not rely in generation or exchange of topology knowledge and can utilize efficiently various available telecommunication resources (e.g., airtime, or downlink and uplink radio channels). Thus, the features or aspects of the subject disclosure can afford low resource overhead with ensuing energy efficiency advantages such as battery lifetime preservation of hybrid devices that are part of the mesh network.

At least another advantage of the aspects or features disclosed herein with respect to routing, or forwarding, data directly over a radio link is that data forwarding as described herein is accomplished through multi-hop free-space optical communication (e.g., WOC), which can result in higher data throughput, increased security, and higher energy efficiency as compared to conventional radio telecommunication.

Figure 2:
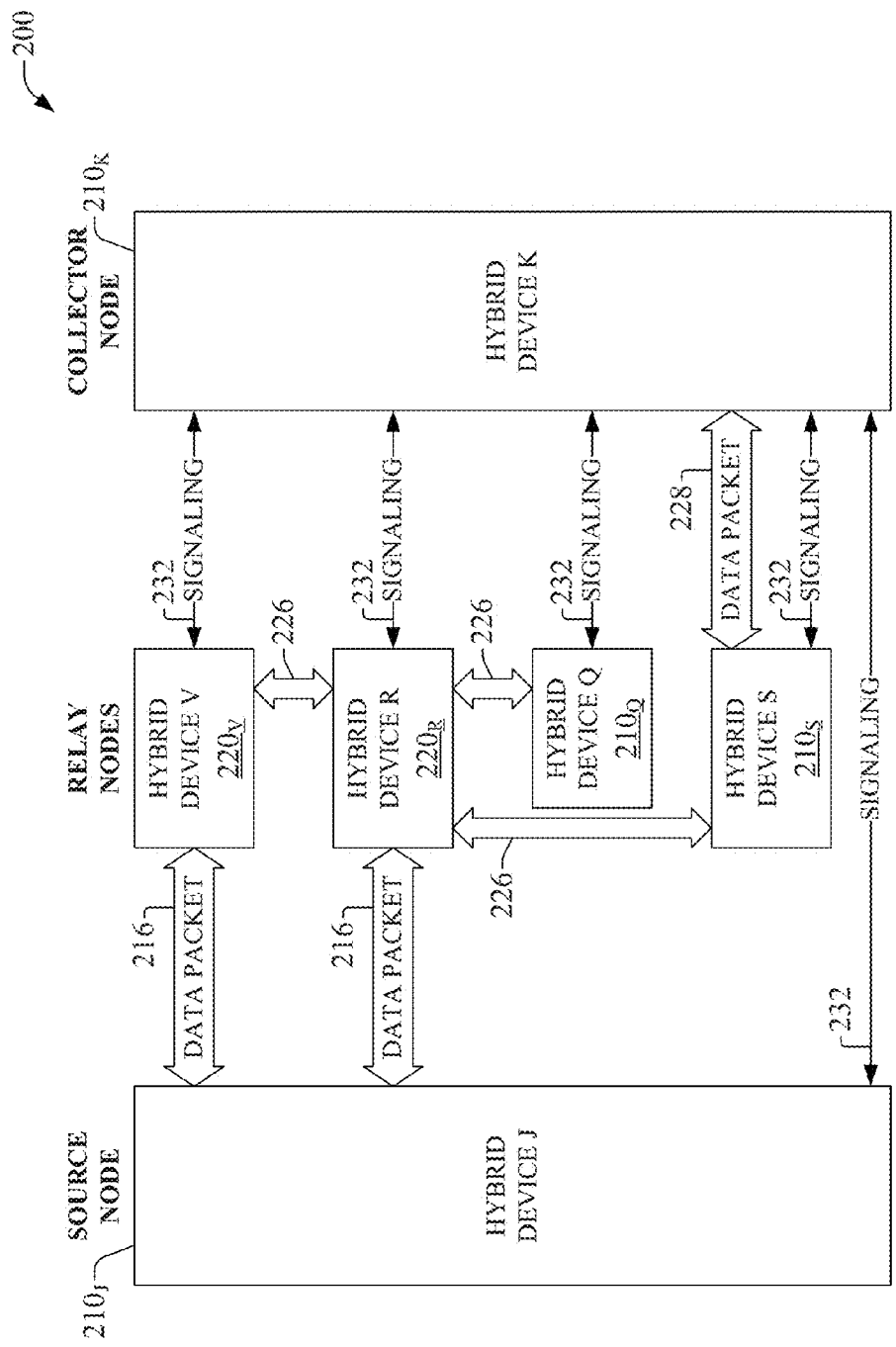
FIG. 2 displays a block diagram of an example system that routes a data packet in accordance with aspects described herein; traffic and signaling are illustrated in the block diagram.
Figure 3:
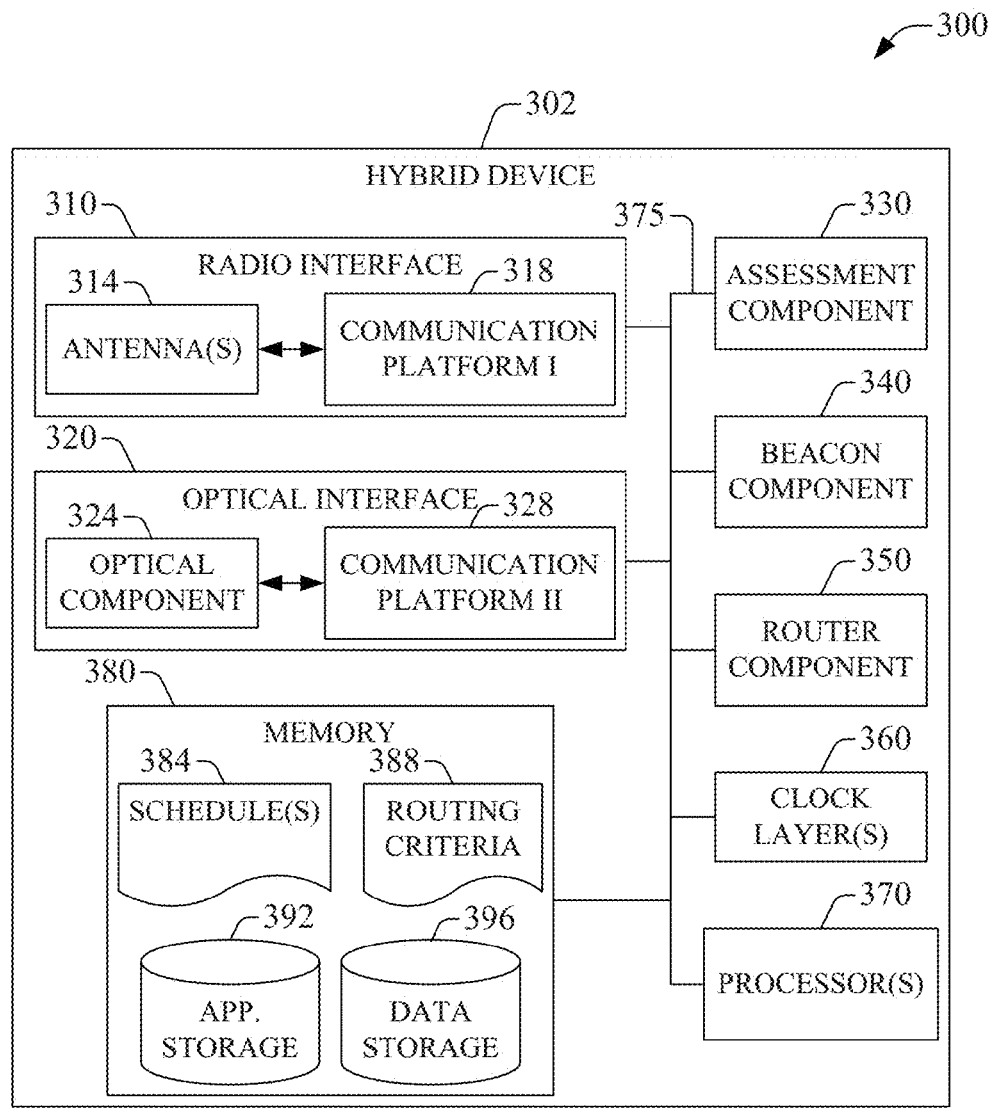
FIG. 3 is a block diagram of an example embodiment of a device that can operate in a mesh network of hybrid devices in accordance with aspects described herein.

Additional details of hybrid devices and related data forwarding, or routing, in accordance with aspects of the subject disclosure are described next in connection with FIGS. 2-3. In example system 200, source node is embodied in hybrid device J $210_J$ (J is a natural number) and collector node is embodied in hybrid device K $210_K$ (K is a natural number and K≠J). As described supra, radio communication ranges of source node and collector node overlap, whereas their ranges of optical communication, e.g., WOC, are spatially disjointed (see, e.g., FIG. 1). Moreover, wireless delivery of data from source node to collector node is enabled, at least in part, through a set of hybrid devices $220_V$, $220_R$, $220_Q$, and $210_S$, termed collectively "relay nodes;" V, R, Q, and S are natural numbers. While for illustration purposes four relay nodes are illustrated, it should be appreciated that a set of relay nodes can include two or more hybrid devices. Relay nodes are deployed within the radio communication range of hybrid device $210_K$.

A hybrid device in example system 200 (or example wireless environment 100) can receive and transmit wireless signal(s) (e.g., signaling 232 or data) from and to a disparate hybrid device through a set of communication interfaces. In one or more embodiments, such as example embodiment 300, a hybrid device can include two communication interfaces to transmit and receive wireless signal: (i) radio telecommunication interface 310 (also referred to herein and in annexed drawings as radio interface 310) and (ii) optical telecommunication interface 320 (also referred to herein and in annexed drawings as optical interface 320). Radio interface 310 includes antenna(s) 314 and communication platform I 318, whereas optical interface 320 includes optical component 324 and communication platform 328. Antenna(s) 314 receive and transmit electromagnetic (EM) radiation with wavelengths in at least the radiofrequency or microwave portion of the EM spectrum; received EM radiation is conveyed to communication platform I 318 for processing. Optical component 324 can receive and transmit EM radiation in the visible, infrared, or higher-frequency portion of the EM spectrum, and can convey received signal(s) to communication platform II 328. Communication platform I 318 and communication platform II 328 comprise electronic components and associated circuitry that provides for processing and manipulation of received signal(s) and signal(s) to be transmitted, wherein the such signal(s) are received or transmitted in suitable portions of the EM spectrum. The electronic components and circuitry can include a set of one or more chipsets that enable digital-to-analog/analog-to-digital conversion, multiplexing/demultiplexing signal(s), coding/decoding signal(s), conveyed in accordance with a telecommunication protocol associated with a telecommunication technologies. In one or more embodiments, at least one of communication platform I 402 or communication platform II 452 can include circuitry (e.g., one or more chipsets; not shown) and at least a portion of one or more processors to switch radio technology or optical technology within a configurable and upgradable set of technologies in order to effect radio or optical telecommunication.

Source node, collector node, and each node in the set of relay nodes receive via respective radio interfaces, signaling 232 broadcasted by hybrid device $210_K$. Signaling 232 conveys a broadcast message, such as a beacon message, that is utilized by each of such nodes to determine RLQM value(s). The broadcast message, e.g., the beacon message, includes at least one of an identity (ID) of the collector node, or a broadcast message ID. The broadcast message ID, or beacon message ID, is updated (e.g., increased) for each instance the broadcast message, e.g., the beacon message, is broadcasted. In one or more embodiments of a hybrid device, e.g., embodiment 300, beacon component 340 can generate the broadcast message and related identifier(s). In addition, beacon component 340, through at least one of radio interface 310 or optical interface 320, can deliver the generated broadcast message. Beacon component 340 can transmit broadcast message(s) periodically, with a period τ, or in accordance with a predetermined schedule. Both the period τ and the predetermined schedule can be configurable and retained in schedule(s) store 384, also termed herein as schedule(s) 384, within memory 380. Beacon component 340 can exploit clock layer(s) 360 to account time and determine an instant in which a broadcast message is to be transmitted.

When the broadcast message, e.g., beacon message, that is delivered as part of signaling 232, is received by a hybrid device within the radio communication range of the collector node (e.g., $210_K$), the hybrid device records at least one of the ID of the collector node, the beacon message ID, and one or more RLQM value(s) determined based at least on the broadcast message. In an aspect, an RLQM can include one or more metrics for signal strength such as radio signal strength (RSS) indicator(s) or received signal code power (RSCP) indicators. In addition or in the alternative, RLQM can include quality metrics such as signal-to-noise ratio (SNR), signal-to-noise-and-interference ratio (SNIR), or energy-per-chip over total received power ($E_c/N_0$) coefficient(s). The hybrid device (e.g., $220_V$ or $220_R$) can retain one or more records of the foregoing information. In one or more embodiments of a hybrid device, such as embodiment 300, a record of at least one of the ID of a collector node, a beacon ID, and one or more RLQM value(s) determined based at least on received broadcast message(s) can be recorded within memory 380 as part of data storage 396. If a new broadcast message is received by the hybrid device, such record is updated. In example system 200, hybrid device $210_J$ and the set of hybrid devices $210_V$, $210_R$, $210_Q$, and $210_S$ are within radio communication range of hybrid device $210_K$ and thus record the foregoing information as described hereinbefore.

To route a data packet 216 from source node to collector node, hybrid device J $210_J$ delivers the data packet through an optical (e.g., a WOC) wireless link; hybrid devices $220_V$ and $220_R$ can be deployed in such an arrangement that are able to receive the data packet 216, whereas hybrid devices $210_Q$ and $210_S$ do not receive the data packet 216. In an aspect of the subject disclosure, in addition to payload data, a data packet (e.g., data packet 216) routed in accordance with aspects described herein, includes at least one of an ID of the collector (or destination) node, a packet ID, or an RLQM value. The RLQM value is determined by the hybrid node that transmits the data packet (e.g., data packet 216), wherein the RLQM value conveys radio signal quality delivered by the collector node and observed by such hybrid node. In one or more embodiments of a hybrid device, e.g., embodiment 300, assessment component 330 can generate value(s) of a radio link quality metric. In an aspect, to generate such values, assessment component 330 can collect and analyze broadcast message received through at least one of radio interface 310 or optical interface 320, and evaluate the RLQM. To perform such evaluation, assessment component 330 can analyze collected broadcast message to extract noise features such as spectral profile, noise amplitude, statistics, etc., as part of evaluation of the RLQM. It should be appreciated that as operational complexity of a hybrid device increases, RLQMs that are more complex can be evaluated.

As described supra, based at least on determined values of an RLQM and relative magnitude of such values with respect to the RLQM value determined by the source node, one or more hybrid devices that received the data packet 216 and are part of the set of relay nodes can forward the data packet 216. In example system 200, hybrid device $220_R$ transmits a data packet 226 via an optical link, wherein the data packet 226 includes the same payload data as the received data packet 216 and the value of the RLQM determined by hybrid device $220_R$. Hybrid devices that are part of the set of relay nodes and receive the data packet 226 can exploit, at least in part, respectively determined RLQM values to transmit an instance of data packet 226; such instance can be characterized for a specific RLQM value associated with the forwarder hybrid device. In an aspect, the instance of data packet 226 includes the same payload data and an updated value for the embedded RLQM value transported in the data packet. As illustrated in example system 200, hybrid device $210_S$ can forward, e.g., rebroadcast, the updated version of the received data packet 226; the updated version of such data packet 226 is labeled 228 and is received by collector node $210_K$.

In an aspect of the subject disclosure, an intermediate node can forward the received data packet 226 if a forwarding eligibility criterion, or routing criterion, is fulfilled. In an aspect, an eligibility forwarding criterion is based on a difference amongst an RLQM value (e.g., RSS indicator) generated at the intermediate node and the RLQM value embedded in the data packet 226 to be forwarded: If the difference exceeds a predetermined margin, or margin, the intermediate node can transmit the data packet. Accordingly, the difference amongst RLQM values serves as a forwarding or routing control parameter that can ensure that the data packet is forwarded towards the collector node, and can render knowledge of the topology of the mesh network unnecessary for data forwarding purposes. In one or more embodiments of a hybrid device, e.g., embodiment 300, the forwarding eligibility criterion can be retained as part of routing criteria store 388, also referred to herein as routing criteria 388, within memory 380.

To drive delivery of data packet(s) towards the collector node, prior to transmission of data packet 228, an intermediate node, or "forwarder," can update the data packet 228 to substitute a received RLQM value with an RLQM value for broadcast message received from collector node that is generated by the intermediate. As indicated supra, because strength, or amplitude, of an EM radiation wave decreases as such wave propagates in space, hybrid devices that are farther apart from a collector node can exhibit lower RLQM values than hybrid devices that are closer to the collector node. Therefore, the forwarding eligibility criterion can ensure that data packets, or any other quanta of data, are forwarded towards the collector node and not away from the collector node (e.g., $210_K$).

In response to reception of data packet 228, hybrid device $210_K$, or any other hybrid device that embodies the collector node, broadcasts an acknowledgement (ACK) signal, or message, through at least one of a radio interface or an optical interface. If hybrid device $210_K$ employs a radio interface, the ACK signal or message can be delivered as part of signaling 232. Hybrid devices (e.g., $220_V$ or $220_Q$) that receive the ACK signal and have available (e.g., queued for delivery) the acknowledged data packet can discard an instance of the acknowledged data packet. In an aspect, for source node(s), e.g., hybrid device $210_J$, the ACK signal serves as an end-to-end indication of data delivery. In an aspect, the ACK signal can be embodied, for example, in one or more reserved bits in a packet header, a light-payload (e.g., of the order of 1 byte) data packet, a predetermined multi-bit word conveyed in a radio frame within a control channel or in band, etc. In one or more embodiments of a hybrid device, e.g., embodiment 300, beacon component 340 can generate and deliver, at least in part via at least one of radio interface 310 or optical interface 320, the ACK signal.

Amongst the various features of the subject disclosure, hybrid devices that are described herein can implement contention resolution protocol(s) to mitigate likelihood of data collision(s) of data packets, or quanta of data. In scenarios that include high-density mesh network(s) of hybrid devices, wherein a plurality of two or more hybrid devices can satisfy forwarding eligibility disclosed herein and thus can deliver a data packet at the same or substantially the same time. In one or more embodiments, hybrid device(s) can exploit the following example contention resolution protocol. After receiving a data packet and determining eligibility for transmission (e.g., a forwarding criterion is fulfilled), an intermediate node queues the data packet and halts telecommunication, e.g., switches telecommunication to idle mode, for a random time interval. In an aspect, magnitude, or span, of the random time interval can be based at least in part on the difference amongst a current or nearly-current RQLM value for the intermediate node and the RQLM value received within the data packet. For example, the span of the random time interval can be inversely proportional to such difference, wherein the larger the difference, the shorter the intermediate node, or "forwarder," halts (or interrupts) telecommunication. A probability distribution (e.g., Poisson distribution, exponential distribution) for random time intervals can be retained, for example, in data storage 396; the argument of the probability distribution can be the difference between two RLQM values. Such contention resolution protocol can provide an intermediate node, or forwarding node, that is closest to the collector node (e.g., $210_K$) with the highest delivery priority because the RLQM value for such node can be the highest amongst all surrounding intermediate nodes, or forwarder nodes; therefore, it has the largest difference amongst received RLQM value and generated RLQM value. After the intermediate node with highest delivery priority transmits the data packet, other intermediate nodes that are currently in their halting, or waiting, interval detect transmission of the data packet that is queued with an embedded RLQM value that is higher than respective value(s) such intermediate node(s) generated. Accordingly, in an aspect, these intermediate nodes terminate respective halt cycles, e.g., periods of idled telecommunication of the data packet, and discard the data packet that is queued for delivery.

In one or more embodiments of a hybrid device, e.g., embodiment 300, contention resolution protocol(s) can be retained in memory 380 as part of application storage 392; the contention resolution protocol(s) can be stored as one or more sets of code instructions, which can be executed by processor(s) 370 in order to implement such contention resolution protocol(s). Clock layer(s) 360 can implement configure (e.g., initiate, reset, advance . . . ) a timer associated with time interval in which telecommunication is halted as part of a contention resolution protocol; timer value(s) or count(s) can be retained in data storage 396. Such timer is herein referred to as contention timer. Clock layer(s) 370 can exploit one or more protocols or clock sources to configure the contention timer. Data queued as a result of implementation of a contention resolution protocol can be retained in data storage 396.

In one or more embodiments of hybrid devices in accordance with aspects described herein, hybrid device 302 includes a processor(s) 370 configured to provide or that provides, at least in part, functionality to substantially any or any component, interface, layer(s), or other functional element(s) within the hybrid device 302. To provide at least such functionality, processor(s) 218 can execute code instructions retained in memory 380, wherein the code instructions can be retained, for example, in application storage 392. In particular, but not exclusively, to provide at least a part of the functionality of the various functional elements of hybrid device 302, processor(s) 370 can implement one or more of the example methods described herein.

In hybrid device 302, functional elements, e.g., components, interfaces, layer(s), can be mutually and functionally connected via bus 375. Such functional elements are also connected to memory 380 via bus 375. Processor(s) 370 also can be functionally connected to components, interfaces, layer(s), or substantially any or any functional elements that are part of hybrid device 302. Bus 375 enables data or information exchange amongst the functional elements that it operationally connects. Such data or exchange of information allows, at least in part, various of the functional aspects of hybrid device 302. In an aspect, bus 375 can be embodied in at least one of a memory bus, a system bus, an address bus, a message bus, or any other conduit, protocol, or mechanism for data or information exchange among components that execute a process or are part of execution of a process.

In particular, processor(s) 370 is operationally coupled, through bus, to radio telecommunication interface 310 (also referred to herein and in annexed drawings as optical interface 320) and optical telecommunication interface 320 (also referred to herein and in annexed drawings as optical interface 320), and can enable at least part of one or more operations on data (e.g., packets, symbols, bits, or chips) that can enable telecommunication in accordance with a telecommunication protocol and associated protocol(s). Processor(s) 370 can afford at least part of multiplexing/demultiplexing operation(s), modulation/demodulation operation(s), coding/decoding operation(s), or the like. Such operations can be include, for example, effecting direct and inverse fast Fourier transforms, selection of modulation rates, selection of data packet formats, inter-packet times, etc.

Moreover, processor(s) 370 is functionally connected, through bus 375, to memory 475 in order to store and retrieve information such as code instructions, data structures, etc., necessary to operate and/or provide functionality, at least in part, to communication platform 405, messaging client 210, functional platform 465, technology selector 455, multimode chipset(s) 445, or other functional elements of device 410. In addition to illustrated memory elements, memory 380 also can store, for example, data structures, code instructions and program modules, or substantially any type of software applications or at least part of firmware application (e.g., device logic); telecommunication protocol(s); operating system or device information; code sequence hypotheses, and modulation and multiplexing hypotheses; spreading and pilot codes; and so on. Furthermore, memory 1845 also can retain content(s) (e.g., end-user or application data, data generated by other devices, or the like); security credentials (e.g., passwords, encryption keys, digital certificates, biometric reference indicators like voice recordings, iris patterns, fingerprints); or the like.

In one or more alternative or additional embodiment(s), processor(s) 370 can be distributed amongst one or more components of hybrid device 302. In further one or more alternative or additional embodiments, one or more components of hybrid device 302 can be implemented as software application(s) or firmware application(s) and can reside within memory 380 as one or more sets of code instructions that, when executed by processor(s) 370, implement the one or more components and functionality thereof as described herein.

While not shown, hybrid device 302 can include a power supply (e.g., a Li-based battery), which can be removable or fixed. The power supply (not shown) can be rechargeable and can be connected to auxiliary sources of power such as a photovoltaic panel.

In another aspect of the subject disclosure, in one or more embodiments with higher complexity that described supra, assessment component 330 can include an intelligent component (not shown) that can establish autonomously the period t of delivery of broadcast message(s). The intelligent component (not shown) also can autonomously adjust one or more routing criteria, e.g., adjust the predetermined margin to which difference amongst RLQM values in an intermediate node are compared to.

Such intelligent component (not shown) can exploit artificial intelligence (AI) methods to infer (e.g., reason and draw a conclusion based upon a set of metrics, arguments, or known outcomes in controlled scenarios) period $\tau$. In addition, AI methods can be employed to optimize a utility trade-off between the cost of delivering broadcast messages at a specific rate $\tau^{-1}$ and the benefit there from related to accurate RLQM values that hybrid devices can produced with regularly updated broadcast messages.

Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, analysis component 218, or components therein, can employ one of numerous methodologies for learning from data and then drawing inferences from the models so constructed. Such methodologies can be retained in memory 222. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

FIGS. 4A-4B illustrate, respectively, block diagrams of example embodiments 400 and 450 of a communication platform that is part of a radio telecommunication interface and an optical telecommunication interface in accordance with aspects described herein. Communication platform I 402 includes receiver(s)/transmitter(s) 406 that can convert signal(s) from analog to digital upon reception, and from digital to analog upon transmission. Signals that are received or converted to be transmitted have wavelengths in the radiofrequency or microwave portion of the EM spectrum. In addition, based upon antenna structure (e.g., antenna(s) 314; not shown in FIG. 4) and telecommunication protocol, receiver(s)/transmitter(s) 406 can divide a single data stream into multiple, parallel data streams, or perform the reciprocal operation Likewise, communication platform II 452 includes receiver(s)/transmitter(s) 456 that can convert signal(s) from analog to digital upon reception, and from digital to analog upon transmission. For such communication platform, signals that are received or converted to be transmitted have wavelengths in visible or infrared portion of the EM spectrum. Wavelengths of EM radiation manipulated (e.g., received, transmitted, or processed) by communication platform I 310 can be determined at least in part by a network administrator that deploys the mesh network of hybrid devices that exploit communication platform I 310 for telecommunication. In addition, wavelengths of EM radiation manipulated by communication platform II 320 can be determined by technology in which optical component 324 is based, e.g., monochromatic LED or white-light LED, monochromatic semiconductor-quantum-dot based optical emitter, etc.

In communication platform I 402, coupled to receiver(s)/transmitter(s) 406 is a multiplexer/demultiplexer component 408 that enables manipulation in time and frequency domain of received signal(s) or signal(s) to be transmitted via radio telecommunication interface (not shown in FIG. 4B). Electronic mux/demux component 408 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, based on telecommunication protocol employed for radio telecommunication, mux/demux component 408 can scramble and spread information (e.g., codes) according to substantially any code known in the art; e.g., Hadamard-Walsh codes, Baker codes, Kasami codes, polyphase codes, and so on. A modulator/demodulator (mod/demod) component 410 is also a part of communication platform I 402, and can modulate information according to multiple modulation techniques, such as frequency modulation, amplitude modulation (e.g., M-ary quadrature amplitude modulation (QAM), with M a positive integer), phase-shift keying (PSK), and the like. Mod/demod component 410 also can demodulate information processed in accordance with the foregoing modulation techniques.

Communication platform II 452 includes a multiplexer/demultiplexer component 458 that is functionally connected to receiver(s)/transmitter(s) 456 and enables manipulation in time and frequency domain of received signal(s) or signal(s) to be transmitted through optical telecommunication interface (not shown in FIG. 4B). Mod/demod component 460 is functionally connected to mux/demux component 458 and can modulate information according to multiple modulation techniques suitable for processing of wireless signal received or to be transmitted in accordance with optical telecommunication protocol(s). For instance, mod/demod component 460 can implement frequency modulation, amplitude modulation (e.g., M-ary quadrature amplitude modulation (QAM), with M a positive integer), phase-shift keying (PSK), and the like. Mod/demod component 460 also can demodulate information processed in accordance with the foregoing modulation techniques.

Coder/decoder component 462 can process signal(s) that are received or to be transmitted in accordance with radio telecommunication protocol(s). In an aspect, decoding can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. Likewise, coder/decoder component 462 can process signal(s) that are received or to be transmitted in accordance with optical telecommunication protocol(s). To at least that end, coder/decoder component 462 can exploit substantially the same or the same coding/decoding protocol(s) as those implemented by coder/decoder component 412.

Functional elements, e.g., component(s), coder/decoder, receiver(s)/transmitter(s), are functionally connected via bus 416, whereas functional elements, e.g., component(s), coder/decoder, receiver(s)/transmitter(s), in communication platform II 452 are functionally connected through bus 466. Bus 416 and bus 466 enable exchange of data, signaling, or any other information, amongst the functional elements connected through such buses.

In view of the example system(s) or device(s) described above, example method(s) that can be implemented in accordance with the disclosed subject matter can be better appreciated with reference to flowcharts in FIGS. 5-8. For purposes of simplicity of explanation, methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute code instructions retained in a memory, or any computer- or machine-readable medium, to implement method(s) described herein; the code instructions provide a computer- or machine-executable framework to enact the method(s) described herein.

Figure 5:
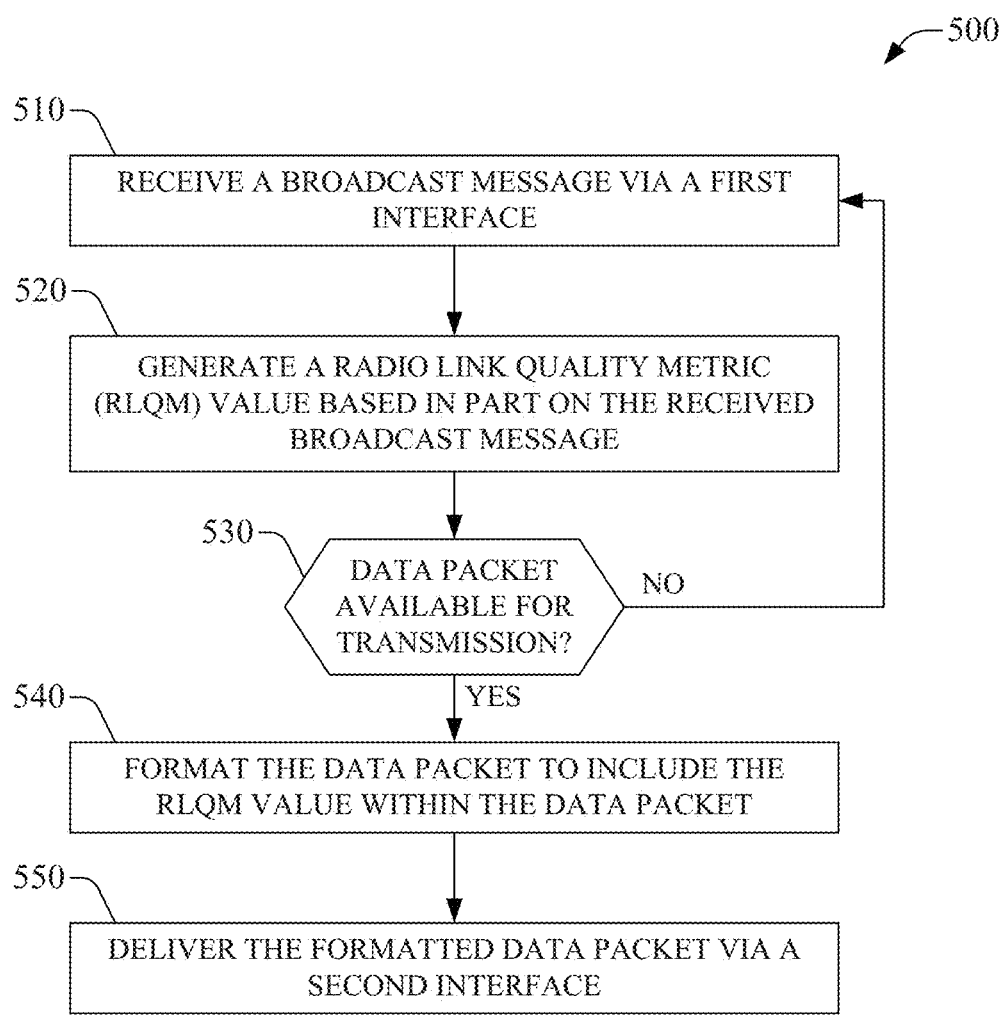
FIG. 5 is a flowchart of an example method for delivering data within a mesh network of hybrid devices in accordance with aspects described herein.

FIG. 5 is a flowchart of an example method 500 for delivering data within a mesh network of hybrid devices in accordance with aspects described herein. A hybrid device that is part of the mesh network can effect the subject example method. While illustrated with respect to communication of a data packet, the subject example method and other example methods described herein (e.g., 600, 700, 800) also can be effected for substantially any or any type of data quantum (e.g., a frame, a symbol) established in accordance with a communication protocol employed by one or more hybrid device that can enact the subject example methods. One or more processors also can perform the subject example method. In an aspect, the one or more processors can provide, at least in part, the functionality of the hybrid device, or component(s) therein. In an aspect, the one or more processors can execute one or more components within the hybrid device to effect at least one act of the subject example method when such one or more components are embodied in a set of code instructions that are part of a software or a firmware application.

At act 510 a broadcast message is received via a first interface. As an example, the first interface can be a radio interface (e.g., radio interface 310). The radio interface (e.g., radio interface 310) can enable telecommunication via EM radiation with radio wavelength. In an aspect, the broadcast message can be received periodically or at scheduled instants from a destination hybrid device (e.g., 104, or 210$_K$), or destination node. At act 520, a radio link quality metric (RLQM) value is generated based in part on the received broadcast message. Generating the first RLQM value includes recording such value, e.g., in a memory functionally coupled to the hybrid device that implements the subject example method. As described supra, the RLQM can include one or more metrics for signal strength, such as radio signal strength (RSS) indicator(s) or received signal code power (RSCP) indicators in scenarios in which the broadcast message is delivered through a radio interface. In addition or in the alternative, RLQM can include quality metrics such as signal-to-noise ratio (SNR), signal-to-noise-and-interference ratio (SNIR), or energy per chip over total received power ($E_c/N_0$).

At act 530, it is probed if a data packet is available for transmission. If a data packet is available, the hybrid device that implements the subject example method 500 is characterized as a source node (e.g., 144 or 210$_J$). At act 540, the data packet is formatted to include the RLQM value, either as part of payload data or a packet header within the data packet. In an aspect, router component 350 can implement the subject act. At act 550, the formatted data packet is delivered via a second interface, such as optical interface 320, which can enable telecommunication via EM radiation with wavelength(s) in the visible or infrared portion of the EM radiation spectrum.

In the example methods described herein, the first interface and the second interface enable telecommunication through disparate technologies. In an aspect, the first interface can have a greater telecommunication range than the second interface, and thus is employed to receive broadcast message(s), whereas the second interface can allow higher data rate(s) than the first interface and thus it is employed for data transmission.

Figure 6:
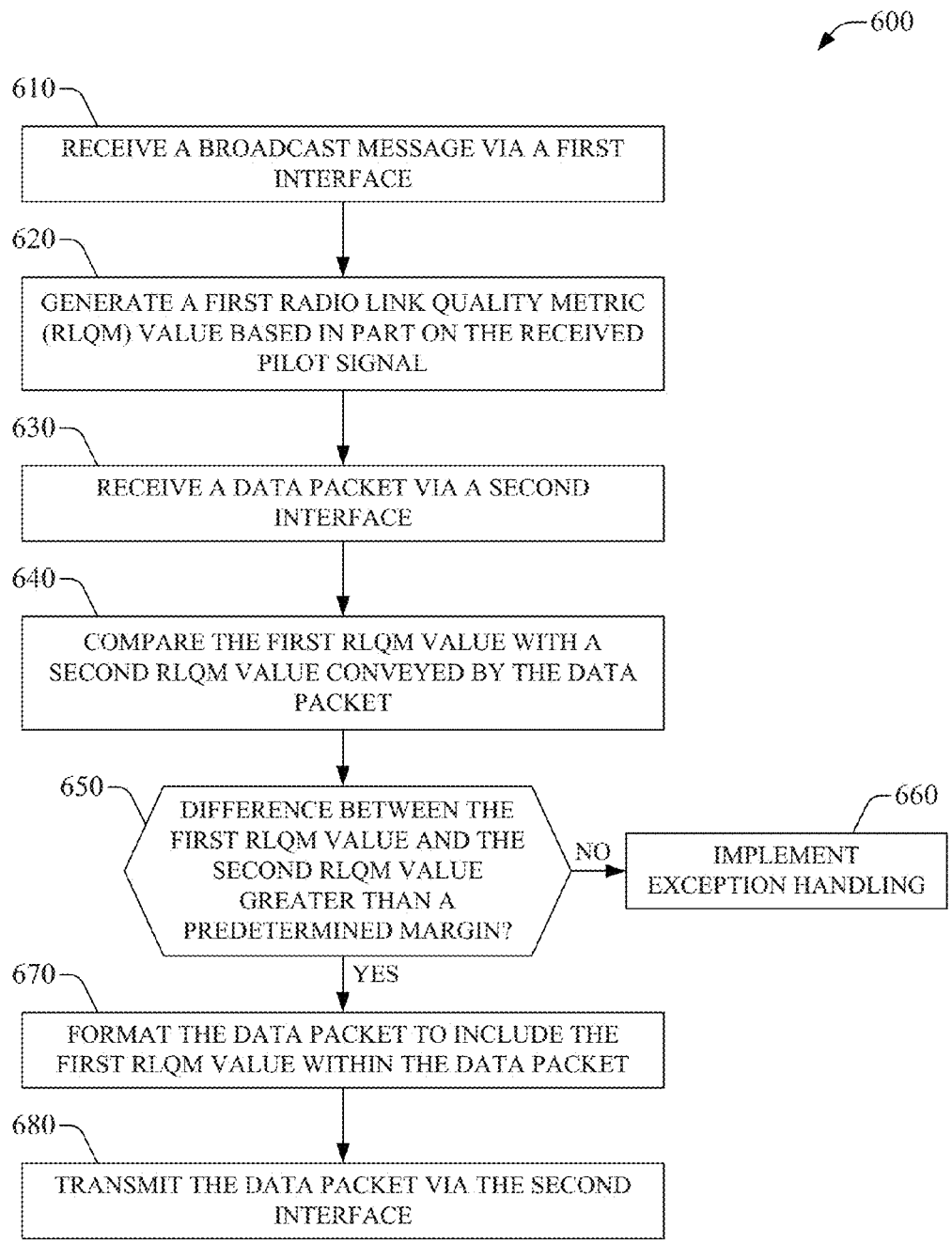
FIG. 6 displays a flowchart of an example method for relaying, or forwarding, data within a mesh network of hybrid devices in accordance with aspects described herein.

FIG. 6 displays a flowchart of an example method 600 for relaying, or forwarding, data within a mesh network of hybrid devices in accordance with aspects described herein. A hybrid device that is part of the mesh network can effect the subject example method. One or more processors also can perform the subject example method. In an aspect, the one or more processors can provide, at least in part, the functionality of the hybrid device, or component(s) therein. In an aspect, the one or more processors can execute one or more components within the hybrid device to effect at least one act of the subject example method when such one or more components are embodied in a set of code instructions that are part of a software or a firmware application. At act 610, a broadcast message is received via a first interface. For example, the first interface can be a radio interface (e.g., 310). The subject act is substantially the same as act 510. As in act 510, the broadcast message can be a beacon message generated and delivered by a collector node, e.g., a hybrid device that is part of the mesh network and to which the data is intended to relayed in one or more hops within such mesh network; the beacon message includes an identity for collector node. At act 620, a first RLQM value is generated based in part on the received broadcast message. Generating the first RLQM value includes recording such value, e.g., in a memory functionally coupled to the hybrid device that implements the subject example method. As in act 520, the RQLM includes an RSS. At act 630, a data packet is received via a second interface. For instance, the second interface can be an optical interface (e.g., 320), which enables the hybrid device that implements the subject example method to communicate wirelessly via EM radiation with wavelength(s) in the visible or infrared portion of the EM radiation spectrum. In an aspect, receiving the data packet includes decoding signal that transports information, e.g., payload data or control data (such as information in packet header(s)) conveyed by the data packet.

At act 640, the first RLQM value is compared with a second RLQM value conveyed by the data packet; the second RLQM value is extracted upon or after the data packet is received in act 630. At act 650 it is determined if the difference between the first RLQM value and the second RLQM values is greater than a predetermined margin. In the negative case, exception handling is implemented at act 660. Exception handling can include discarding the data packet from a data cache within a memory in the hybrid device that implements the subject example method. Conversely, in the affirmative case, the data packet is formatted at act 670 to include the first RLQM value as part of the data packet, such as payload data or control data (e.g., within a packet header). The predetermined margin can be configured by a network administrator based at least on network density near the hybrid device that enacts the subject example method. In the alternative or in addition, the predetermined margin can be determined autonomously by the hybrid device that enacts the subject method based at least in part on detected changes to network configuration (e.g., updated to node neighbor lists, variations in transported traffic or network load conditions, such as traffic congestion. As described supra, such difference serves as forwarding or routing control parameter that (i) can ensure that the data packet is forwarded towards the collector node, and (ii) can render knowledge of the topology of the mesh network unnecessary for data forwarding purposes. At act 680, the data packet is transmitted via the second interface; such as optical interface 320.

It should be appreciated that in one or more additional or alternative example methods for forwarding, data within a mesh network of hybrid devices, act 640 can be part of applying a forwarding rule within routing a set of routing criteria based at least on one or more radio link quality metrics, while act 650 can be part of assessing result(s) of applying the at least one rule according to the set of routing criteria.

Figure 7:
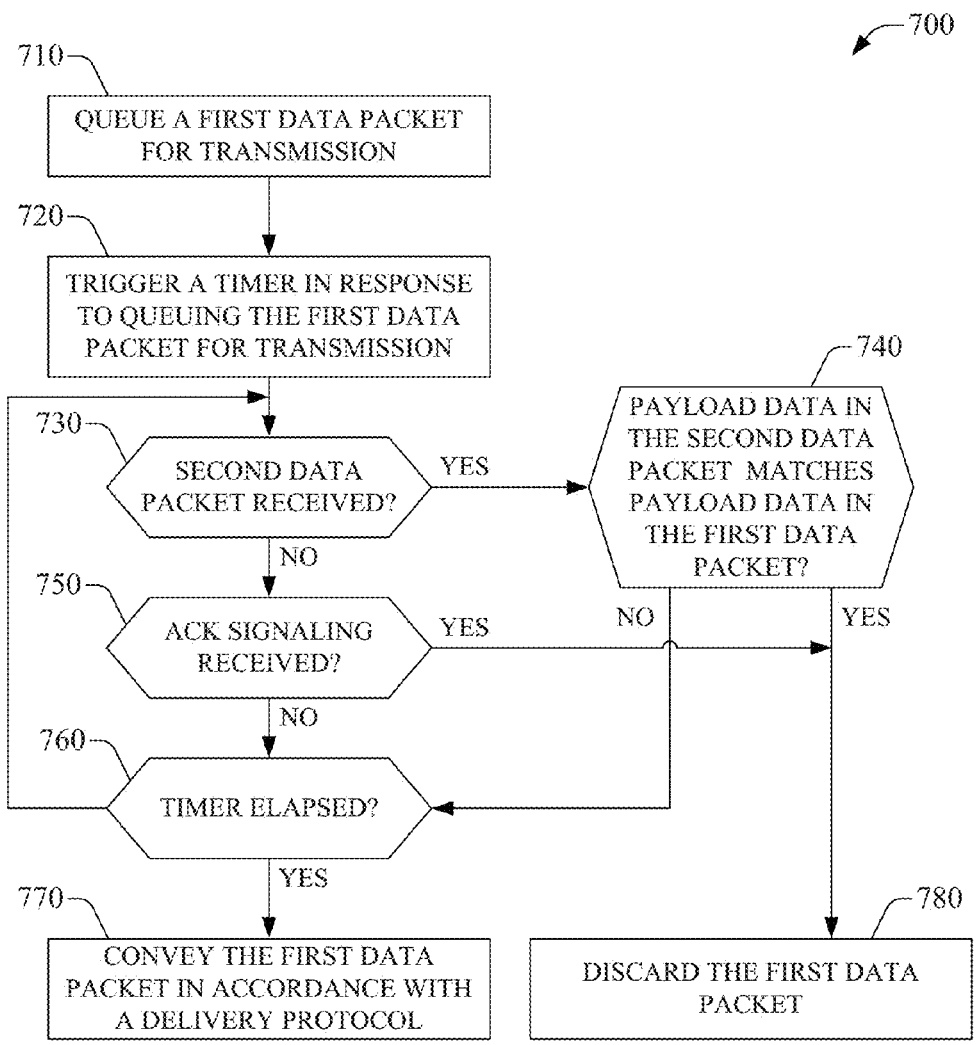
FIG. 7 is a flowchart of an example method for transmitting data in a relay node within a mesh network of hybrid devices in accordance with aspects described herein.

FIG. 7 is a flowchart of an example method for transmitting data in a relay node within a mesh network of hybrid devices as part of data forwarding in accordance with aspects described herein. The subject example method can be enacted as part of act 680 or it can be an embodiment of act 680. A hybrid device that implements example method 600 also can implement the subject example method. Likewise, at least a processor that provides at least part of the hybrid device functionality also can enact the subject example method 700. At act 710, a first data packet is queued for transmission. At act 720, a timer is triggered in response to queuing the first data packet for transmission. In an aspect, the timer embodies a contention timer intended to prevent collision(s) of the first data packet with a disparate data packet transmitted by a hybrid device different from the hybrid device that enacts the subject example method 700. At 730, it is probed if a second data packet is received. Reception of the second data packet can be afforded by an optical interface (e.g., optical interface 320) or a radio interface (e.g., radio interface 310) in the hybrid device that implements the subject example method. In a scenario the second data packet is received, flow is directed to act 740 at which it is determined if payload data in the second data packet matches payload data in the first data packet. A positive outcome in act 740 leads to act 780 in which the first data packet is discarded; for instance, a data cache in a memory within the hybrid device that enacts the subject example method is flushed. However, a negative outcome in act 740, directs flow to act 760, in which it is checked if the timer has elapsed. In an aspect, to actively mitigate collision(s), a timer threshold can be configured as a function that is inversely proportional to the difference amongst an RLQM value determined by the hybrid device that is to relay, or forward, the first data packet and an RLQM value conveyed by the first data packet after received by such hybrid device.

Figure 8:
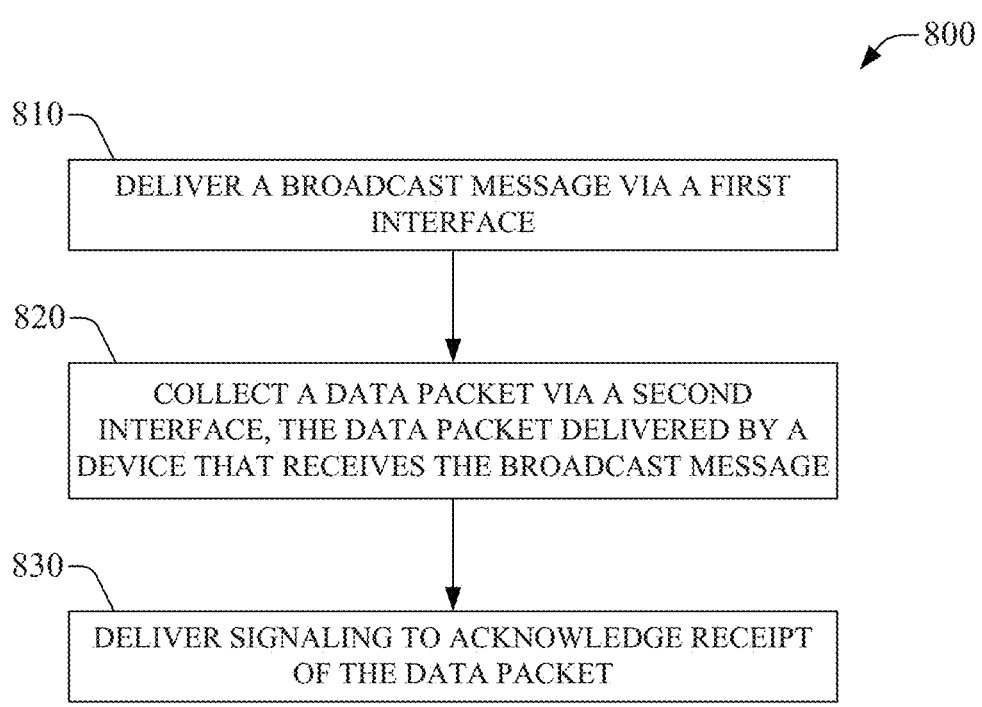
FIG. 8 presents a flowchart of an example method for driving, at least in part, forwarding or relaying of data in a mesh network of hybrid devices in accordance with aspects described herein.

FIG. 8 presents a flowchart of an example method 800 for driving, at least in part, forwarding or relaying of data in a mesh network of hybrid devices in accordance with aspects described herein. A hybrid device that is part of the mesh network of hybrid devices can effect the subject example method. One or more processors functionally coupled to the hybrid device also can perform the subject example method. In an aspect, the one or more processors can provide, at least in part, the functionality of the hybrid device, or component(s) therein. In another aspect, the one or more processors can execute one or more components within the hybrid device to effect at least one act of the subject example method when such one or more components are embodied in a set of code instructions that are part of a software or a firmware application. At act 810, a broadcast message is delivered via a first interface, e.g., radio interface such as radio interface 310. In an aspect, the broadcast message can be delivered periodically, with a period τ, or at specific instants in accordance with a schedule. At act 820, a data packet is collected via a second interface, e.g., an optical interface, wherein the data packet is delivered by a device that receives the broadcast message. In an aspect, the device is a hybrid device that is part of the mesh network of hybrid devices. At act 830, signaling to acknowledge receipt of the data packet is delivered. Delivery of such signaling can be accomplished through at least one of the first interface (e.g., radio telecommunication interface) or the second interface (e.g., optical telecommunication interface).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor and from a first device, a first data packet comprising first quality metric data determined for a first radio link connecting the first device and a second device;
   generating, by the system, a first time value associated with a first transmission of the first data packet to the second device;
   receiving, by the system from a third device, second quality metric data associated with a second transmission of a second data packet to the second device;
   comparing, by the system, the first quality metric data to the second quality metric data, resulting in a quality metric data difference, wherein the first time value is inversely proportional to the quality metric data difference; and
   delaying, by the system, the second transmission of the second data packet in response to a condition associated with the first quality metric data and the second quality metric data having been determined to have been satisfied.

2. The method of claim 1, wherein the condition is associated with a network traffic congestion metric.

3. The method of claim 1, further comprising:
   in response to the comparing, terminating, by the system, the second transmission to the second device.

4. The method of claim 1, wherein the receiving the first data packet comprises receiving the first data packet via a wide beam optical communication interface.

5. The method of claim 4, further comprising:
   discarding, by the system, a data packet queued for delivery to the third device.

6. The method of claim 1, further comprising:
   in response to the comparing, deleting, by the system, the second data packet.

7. The method of claim 6, wherein the receiving the second quality metric data comprises receiving the second quality metric data from an intermediate device.

8. The method of claim 7, wherein the first quality metric data is embedded in the first data packet.

9. A system, comprising:
   a processor; and
   a memory that stores executable instructions that, when executed by the processor, facilitate performance of operations, comprising:
   receiving from a source node device, first data related to a data packet comprising a first quality value related to a first radio link connecting the source node device and a destination node device, wherein a first time value is inversely proportional to the first quality value;
   receiving from the source node device, second data related to the data packet comprising a second quality value related to a second radio link connecting the source node device and the destination node device, wherein a second time value is determined to be inversely proportional to the second quality value; and
   in response to a condition associated with the first time value and the second time value being determined to have been satisfied, transmitting, the data packet to the destination node device.

10. The system of claim 9, wherein the operations further comprise:
    comparing the first quality value and the second quality value, resulting in a quality value difference.

11. The system of claim 9, wherein the operations further comprise:
    conveying the data packet to the destination node device via a wide beam optical communication interface.

12. The system of claim 11, wherein the conveying the data packet is performed in response to the second time value being determined to be greater than the first time value.

13. The system of claim 9, wherein the operations further comprise:
    in response to the condition being determined to have been satisfied, deleting the second data.

14. The system of claim 9, wherein the operations further comprise:
    halting telecommunication of the data packet until the condition has been determined to have been satisfied.

15. The system of claim 14, wherein the operations further comprise:
    in response to the condition being determined to have been satisfied, deleting the data packet.

16. A non-transitory machine-readable storage medium, comprising executable instructions that, when executed by a processor, facilitate performance of operations, comprising:
    receiving, from a first device, a first data packet comprising a first quality metric value determined for a first radio link connecting the first device and a second device;
    generating a first time value associated with a first transmission of the first data packet to the second device;
    receiving, from a third device, a second quality metric value associated with a second transmission of a second data packet to the second device;
    comparing the first quality metric value to the second quality metric value, resulting in a quality metric value difference, wherein the first time value is inversely proportional to the quality metric value difference; and
    delaying the second transmission of the second data packet until a condition associated with the first quality metric value and the second quality metric value has been determined to have been satisfied.

17. The non-transitory machine-readable storage medium of claim 16, wherein the operations further comprise:
    in response to the condition being determined to have been satisfied, sending the first data packet to the second device.

18. The non-transitory machine-readable storage medium of claim 17, wherein the operations further comprise:

in response to the condition being determined to have been satisfied, deleting, by the third device, the first data packet.

19. The non-transitory machine-readable storage medium of claim 17, wherein the sending the first data packet comprises sending the first data packet via a wide beam optical communication interface.

20. The non-transitory machine-readable storage medium of claim 17, wherein the first data packet comprises the first quality metric value, and wherein the first quality metric value is embedded in the first data packet.

\* \* \* \* \*